Jan. 8, 1929.　　　　　　　　　　　　　　　　1,698,186
J. A. CARNIE ET AL
HOOD SHUTTER
Filed Jan. 26, 1927.　　2 Sheets-Sheet 1

INVENTORS
John A. Carnie, and
James A. Sutton
BY F. H. Gibbs
ATTORNEY

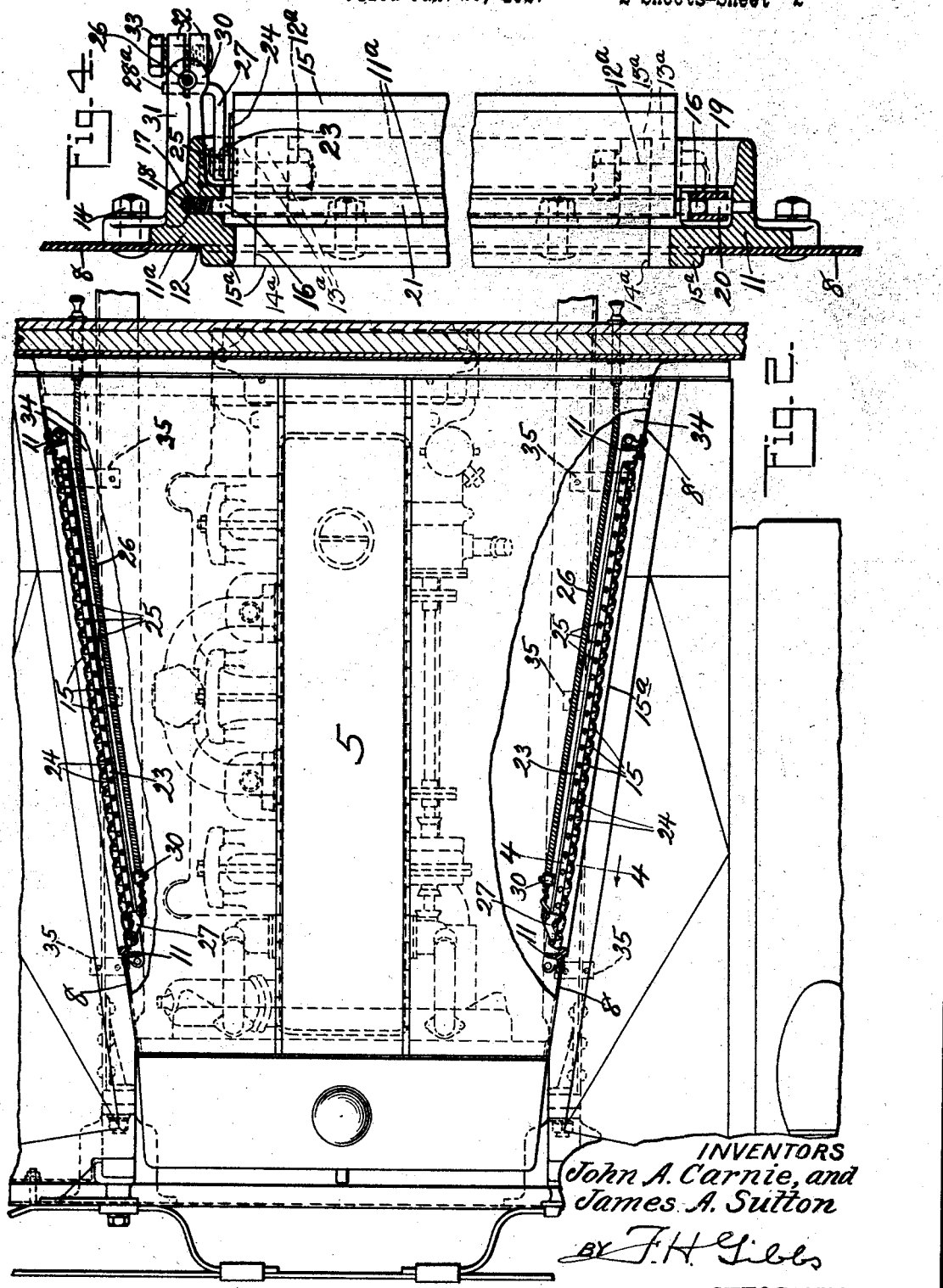

Patented Jan. 8, 1929.

1,698,186

UNITED STATES PATENT OFFICE.

JOHN A. CARNIE AND JAMES A. SUTTON, OF DETROIT, MICHIGAN, ASSIGNORS TO AMERICAN CAR AND FOUNDRY MOTORS COMPANY, OF NEW YORK, N. Y., A CORPORATION OF DELAWARE.

HOOD SHUTTER.

Application filed January 26, 1927. Serial No. 163,824.

Reference is had to the accompanying drawings which illustrate the preferred form of the invention.

In said drawings:

Fig. 2 is an enlarged horizontal sectional view taken on line 2—2 of Fig. 1;

Fig. 4 is a vertical sectional view taken on line 4—4 of Fig. 2.

Our invention relates to automobiles, and more particularly to a combined automobile heater and heat regulator for the engine compartment.

The principal object of this invention is to provide a heat regulator for the engine compartment which will permit the engine to maintain a maximum temperature so as to facilitate the operation of the engine for cold weather driving, and at the same time heat the interior of the automobile.

The invention further contemplates a heat regulator for automobile engine compartments wherein the discharge of heated air is governed, thus retaining the engine at a safe, efficient operating temperature.

It is also an object of our invention to provide a heat regulator of this character which is constructed as a unit for installation in the side panels of the automobile hood.

The invention also provides means at the sides of the engine hood or compartment for permitting the egress of air entering the compartment through the radiator in the usual manner, embodying adjustable shutters, having means for adjusting the same whereby the engine may be retained at a predetermined temperature.

Another object of the invention resides in the provision of an automobile hood which may be opened to gain access to the engine or compartment therefor without disturbing the heat regulator or its control mechanism.

It is to be understood that the invention is not limited to the exact details of construction shown and described, as it is obvious that various modifications thereof within the scope of the claims will occur to persons skilled in the art.

Figure 1:
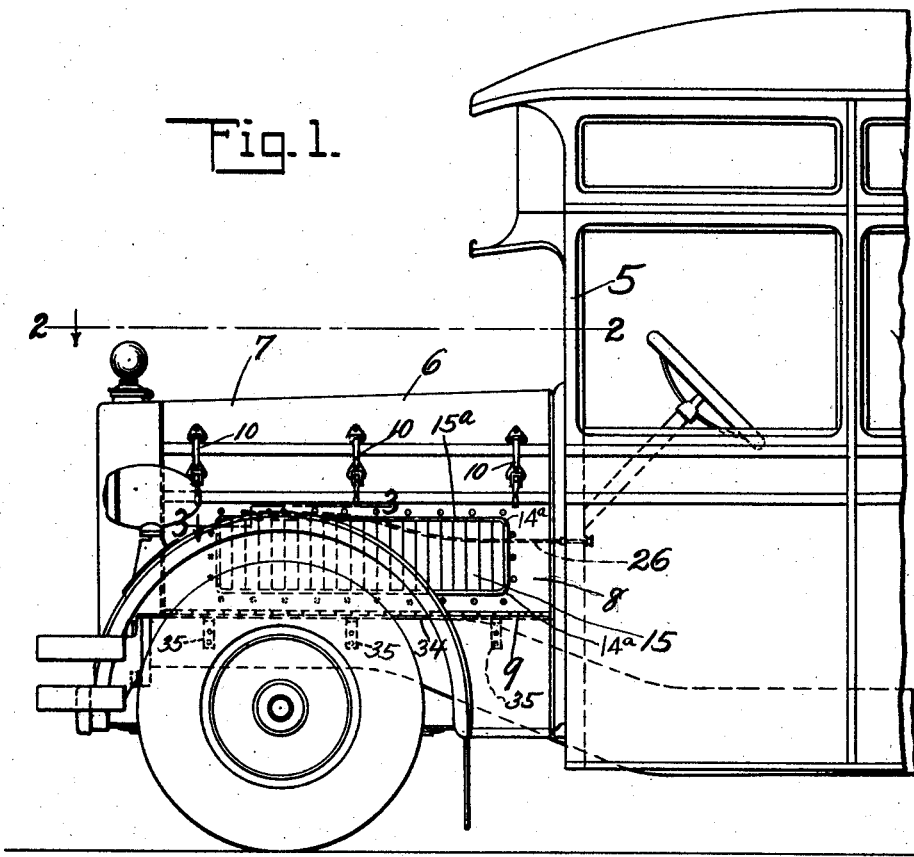
Fig. 1 is a fragmentary side elevation of an automobile equipped with our invention.

Referring to the invention as illustrated in the accompanying drawings, a conventional automobile is designated at 5, including the hood 6 which comprises a removable top section 7 and side panels 8, having their lower edges pivoted to the chassis by hinges 9. As illustrated in Fig. 1, the upper edges of the side panels 8 extend to the longitudinal edges of the top section 6 and are normally retained in closed position by means of suitable yieldable fastenings 10. Thus in order to gain access to the engine compartment it is only necessary to disengage the yieldable fastenings 10, the top section 6 lifted, and the panels 8 swung outwardly.

Figure 3:
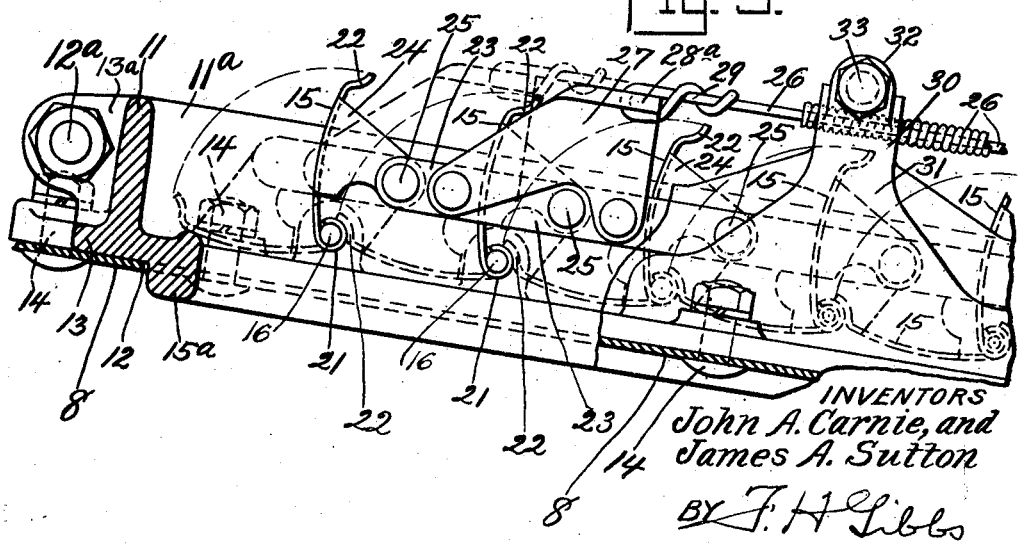
Fig. 3 is a longitudinal sectional view taken on the line 3—3 of Fig. 1, and having parts broken away.

Each of the panels 8 is provided with a heat regulating device, and inasmuch as they are identical, a description of one will suffice for both. The heat regulating devices each comprise a frame 11 secured to the inner face of the panels 8 and formed of castings 11$^a$ connected together by bolts 12$^a$ extending through meeting ears 13$^a$, as shown in Fig. 3; the meeting edges of said castings being indicated at 14$^a$ in Fig. 1, the castings providing top, bottom and side sections. This frame 11 is arranged adjacent an opening 12 formed in the panel and is provided with a marginal flange 13 by which said frame is secured to the panel through the medium of bolts 14 or the like.

As illustrated partly in Figs. 3 and 4, the front face of the frame is formed with a rectangular bead 15$^a$ that projects through the opening 12 and extends along the edge thereof and serves to centralize the frame.

For the purpose of controlling the egress of heated air from the hood or engine compartment and thereby control the temperature of the engine, a plurality of vertically disposed shutters 15 are mounted within the frame 11 rearwardly of the bead 15$^a$. Each of these shutters is mounted on a vertical shaft 16, the upper ends of which are received in recesses or bearings 17 provided in the upper side of the frame 11 and engage expansible coil springs 18 accommodated in these recesses or bearings.

The lower ends of shafts 16 are each rounded off as shown clearly in Fig. 4 and rest upon the upper ends of bearing pins 20 and are adapted to pivot thereon; the rounded ends of the rods affording easy pivotal movement. The bearing pins 20 are firmly secured in the bottom section of the frame 11 and the rods 16 are provided with guide sleeves 19 which are pressed on to said rods and turned therewith about the pins 20 upon pivotal movement of the rods 16.

Each of the shutters 15 is fashioned from a length of sheet metal and has its rear end formed with a sleeve 21 to receive the shaft 16. To insure air tight engagement of the free ends of the shutters when the latter are in the full closed position the forward ends of the shutters are formed with semi-circular lips 22, which embrace and conform to the contour of the sleeves 21.

In order to shift the shutters simultaneously, a connecting bar 23 is provided which extends longitudinally along the upper edges of the shutters and has pivotal connection with laterally extending ears 24 carried by the shutters by means of pivots 25.

An actuating mechanism is provided for the shutters, and comprises a Bowden wire 26 extending longitudinally of the hood to a point on the dash of the automobile, where it can be readily operated by the driver. A lever 27 is attached to the bar 23 and projects laterally therefrom and is provided with an upstanding flange 28ª, to which the forward end of the Bowden wire is attached as at 29. Cooperating with the Bowden wire 26 to retain it in adjusted position and thereby retain the shutters in adjusted position, is a clamp 30 through which the Bowden wire passes, the former always engaging the wire with sufficient friction as to normally hold it against longitudinal movement. The clamp 30 is formed from an outstanding arm 31 cast with the upper side of the frame 11 intermediate its ends, and is bifurcated at its outer end to provide coacting clamp jaws 32. An adjusting screw 33 is threadedly engaged with these jaws 32 whereby they may be adjusted to engage the Bowden wire with the requisite friction.

In addition to our invention being a heat regulator for the engine compartment, it also contemplates heating the interior of the automobile. In this connection, the spaces between the chassis and sides of the engine and the rear of the engine are closed by walls 34, the latter being secured to the chassis by brackets 35. It will be apparent that as the only exit for the heated air coming through the radiator is by way of the shutters 15, this heated air will be retained within the hood or engine compartment and thus transmit heat within the automobile. However, only sufficient heat will be retained as to permit safe operation of the engine, and to allow some of the heated air to escape, the shutters will be opened to the desired degree by manipulating the Bowden wire as above set forth.

What is claimed is:

1. An automobile hood having an opening extending longitudinally thereof, a frame attached to the hood and surrounding the opening, a plurality of shutters journaled in the frame for controlling the passage of heat through the opening, a laterally disposed bifurcated element supported by the frame, a semi-flexible operating element longitudinally adjustable through the bifurcated member and having operative connection with the shutters and a friction creating screw engaged with the bifurcated member to cause the bifurcated parts to frictionally engage the operating element.

2. A device of the kind described comprising a frame having spaced recesses in the upper wall thereof, bearing pins secured to the lower wall of the frame and alined with said recesses, pivot rods having their upper ends extended into the recesses and having their lower ends mounted for pivotal movement on the pins, guides at the lower ends of the pivot rods engaging the pins to retain said rods in pivotal contact with said pins, resilient means in the recesses for retaining the rods and guides in connected relation with the pins, shutters mounted on the rods, and means common to said shutters for actuating them simultaneously.

3. A ventilating device of the kind described comprising a frame adapted to be secured to a motor vehicle engine hood adjacent an opening therein, a plurality of shutters, means for actuating said shutters, bearing pins at the lower edge of the frame, pivot rods supported on said pins and to which the shutters are connected, said frame having recesses in the upper portion thereof alined with said pins and receiving the upper ends of the pivot rods, and means in said recesses engaging said upper ends of the rods for restraining the latter against vertical shifting.

In witness whereof we have hereunto set our hands.

JOHN A. CARNIE.
JAMES A. SUTTON.